(12) United States Patent
Pozzi et al.

(10) Patent No.: US 7,685,587 B2
(45) Date of Patent: Mar. 23, 2010

(54) AUTOMATED INSTRUCTION-SET EXTENSION

(75) Inventors: Laura Pozzi, Lugano (CH); Kubilay Atasu, Catalca Istanbul (TR); Paolo Ienne Lopez, Lausanne (CH)

(73) Assignee: Ecole Polytechnique Federal de Lausanne (CH)

( * ) Notice: Subject to any disclaimer, the term of this patent is extended or adjusted under 35 U.S.C. 154(b) by 525 days.

(21) Appl. No.: 10/716,907

(22) Filed: Nov. 19, 2003

(65) Prior Publication Data

US 2007/0162902 A1  Jul. 12, 2007

(51) Int. Cl.
*G06F 9/44* (2006.01)
(52) U.S. Cl. ............... 717/155; 717/151; 717/153; 717/156
(58) Field of Classification Search ........... 717/141, 717/144, 151, 155–157
See application file for complete search history.

(56) References Cited

U.S. PATENT DOCUMENTS

| | | | | |
|---|---|---|---|---|
| 6,708,325 | B2 * | 3/2004 | Cooke et al. | 717/124 |
| 2003/0014743 | A1 * | 1/2003 | Cooke et al. | 717/161 |

OTHER PUBLICATIONS

Laura Pozzi, Miljan Vuletic, and Paolo Ienne. Automatic topology-based Identification of instruction-set Extensions for Embedded Processors, Poster paper in Proceedings of the Design, Automation and Test in Europe Conference and Exhibition, p. 1138, Paris, Mar. 2002.*

A.Alippi, W.Fornaciari, L.Pozzi, M.G.Sami, Determining the Optimum Extended Instruction-Set Architecture for Application-Specific Reconfigurable VLIW CPUs, RSP'01—12th IEEE International Workshop on Rapid System Prototyping, Monterey, CA, Jun. 25-27, 2001.*

Ajay Kumar Verma, Kubilay Atasu, Miljan Vuletic, Laura Pozzi, and Paolo Ienne. Automatic Application-Specific Instruction-Set Extensions under Microarchitectural Constraints, In Proceedings of WASP-1 the 1st Workshop onApplication Specific Processors, Istanbul, Nov. 2002.*

Peymandoust, A. Pozzi, L. Ienne, P. De Micheli, G. Automatic Instruction Set Extension and Utilization for Embedded Processors. Application-Specific Systems, Architectures, and Processors, 2003. Proceedings. IEEE International Conference on Publication Date: Jun. 24-26, 2003. pp. 108-118.*

Atasu, K. Pozzi, L. Ienne, P. Automatic Application-Specific Instruction-Set Extensions Under Microarchitectural Constraints. Design Automation Conference, 2003. Proceedings. Publication Date: Jun. 2-6, 2003. pp. 256-261.*

* cited by examiner

*Primary Examiner*—Jason Mitchell
(74) *Attorney, Agent, or Firm*—Seyfarth Shaw LLP; Brian L. Michaelis

(57) ABSTRACT

Commercial data processors are available that include a capability of extending their instruction set for a specified application, i.e. of introducing customized functional units in the interest of enhanced processing performance. For such processors there is a need for automatically forming the extensions from high-level application code. A technique is described for selecting maximal-speedup convex subgraphs of the application dataflow graph under micro-architectural constraints.

7 Claims, 5 Drawing Sheets

```
identification() {
    for (i = 0; i < NODES; i++) cut[i] = 0;
    topological_sort();
    search(1, 0);
    search(0, 0); }
search(current_choice, current_index) {
    cut[current_index] = current_choice;
    if (current_choice == 1) {
        if (!output_port_check()) return;
        if (!convexity_check()) return;
        if (input_port_check()) {
            calculate_speedup();
            update_best_solution(); } }
    if ((current_index + 1) == NODES) return;
    current_index = current_index + 1;
    search(1, current_index);
    search(0, current_index); }
```

Figure 4: The identification algorithm.

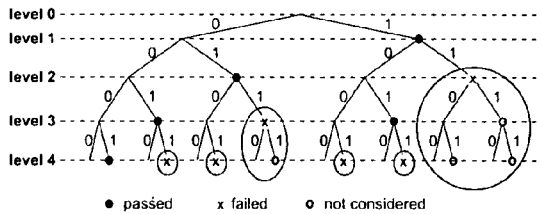

Figure 5: The execution trace of the algorithm for the graph given in Figure 2 and $N_{out} = 1$.

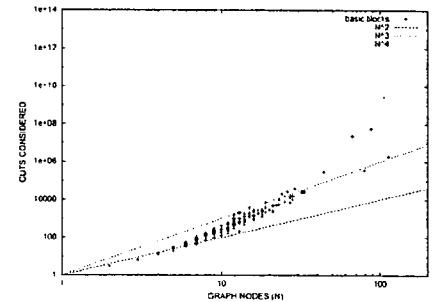

Figure 6: Number of cuts considered by the algorithm with $N_{out} = 2$ and any $N_{in}$.

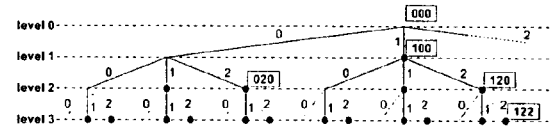

Figure 7: A search tree for two cuts.

AUTOMATED INSTRUCTION-SET EXTENSION

TECHNICAL FIELD

The present invention is concerned with data processing techniques and, more particularly, with automated selection of application-specific extensions of an instruction set for an application processor.

BACKGROUND OF THE INVENTION

For system-on-chip processors, progress has been made towards synthesis of application-specific-instruction-set processors (ASIP), including the generation of complete instruction sets for specific applications. Typically, the goal is the design of an instruction set for which a performance metric is optimized, e.g. minimization of run time, program memory requirements, or execution unit count. Application-specific instructions may be termed complex computer operations, including vector operations, fused operations, specialized operations and the like.

Recent attention has been given also to extending generic processors with units that are more broadly applicable, e.g. in a specified domain of applications. A typical goal of such processor extensions is optimization in the application domain without incurring the area and cost of top-of-the-line superscalar or multithreaded processors. An important motivation towards specialization of existing processors versus the design of complete ASIP's is to avoid the complexity of a complete processor and toolset development. Instead, an available and proven processor design and its extensible toolset can be leveraged, with design efforts focused on a special datagraph.

One method for generating an instruction-set extension from a description of an application is described in published U.S. Patent Application No. US 2003/0074654 by Goodwin et al., entitled "Automatic Instruction Set Architecture". Described there is a basic fusion algorithm.

SUMMARY OF THE INVENTION

An instruction-set extension for an application can include clusters of dataflow operations, e.g. for system-on-chip processors. We have recognized that, in choosing clusters, microarchitectural constraints can be taken into account, and a legality property can be enforced. Multiple-output instructions can be selected, as register-file write-port constraints are met. In a dataflow graph of the application, generic disconnected subgraphs can be identified for implementation as instruction-set extensions.

BRIEF DESCRIPTION OF THE DRAWING

FIG. 4 is a listing of pseudo-code for an identification method.

FIG. 5 is a representation of an execution trace for the graph of FIG. 2.

FIG. 6 is a plot of the number of cuts considered.

FIG. 7 is a representation of a search tree for two cuts.

DETAILED DESCRIPTION

Figure 1:
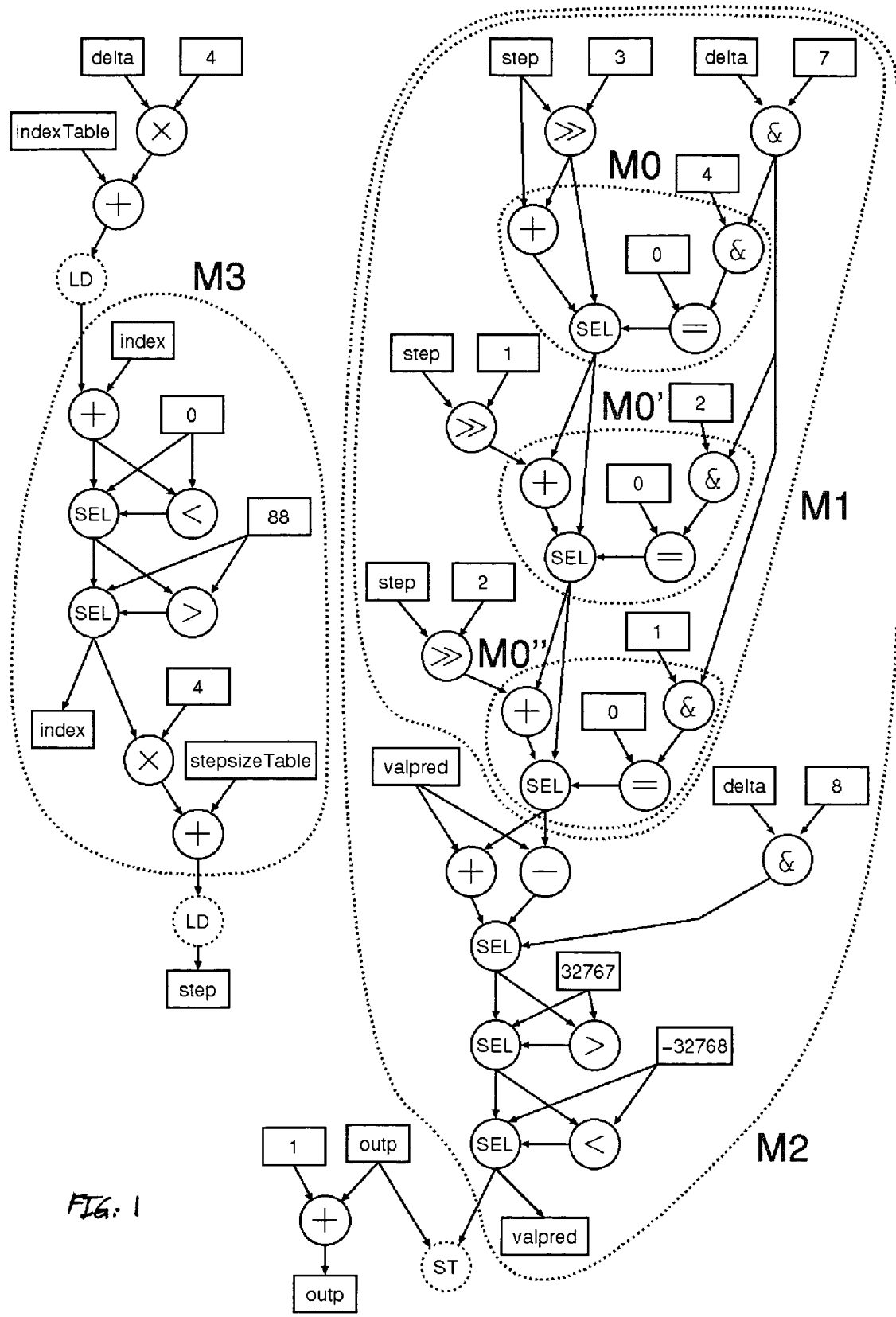
FIG. 1 is a dataflow graph of the basic block most frequently executed in a typical embedded processor benchmark.

The dataflow graph of FIG. 1 is a simple yet realistic example used here for motivational illustration. In the graph, SEL represents a selector node resulting from applying an if-conversion pass to the code underlying the graph.

On inspection of the graph it is apparent that identification based on recurrence of clusters is unlikely to find candidates of more than 3 to 4 operations. Apparent further are recurring clusters, e.g. cluster M0 having multiple inputs which may be prohibitive. Choosing larger, though non-recurrent clusters might ultimately reduce the number of inputs and/or outputs as is the case for subgraph M1 which satisfies even the most stringent constraints of two operands and one result. Inspection of original code suggests that this subgraph represents an approximate 16 by 3-bit multiplication, likely to be chosen by a designer even under severe area constraints. Availability of a further input would also include the subsequent accumulation and saturation operations per subgraph M2. If additional inputs and outputs are available, it would be desirable to implement both M2 and M3 as part of the same instruction, thus exploiting the parallelism of the two disconnected graphs.

For an abstract statement of aims, the following notation is used in the following:

G(V, E) denotes a directed acyclic graph (DAG) representing the dataflow of the basic block, where the nodes V represent primitive operations and the edges E represent data dependencies. Each graph G is associated with a graph G+ (V union V+, E union E+) containing additional nodes V+ and edges E+. The additional nodes V+ represent input and output variables of the basic block. The additional edges E+ connect nodes V+ to V and nodes V to V+.

A cut is a subgraph of G. There are $2^{|V|}$ possible cuts, where |V| is the number of nodes in G. A function M(S) is chosen as a measure of merit for a cut S. It serves as an objective function to be optimized, e.g. an estimate of speedup achievable by implementing S as a special instruction.

Figure 2:
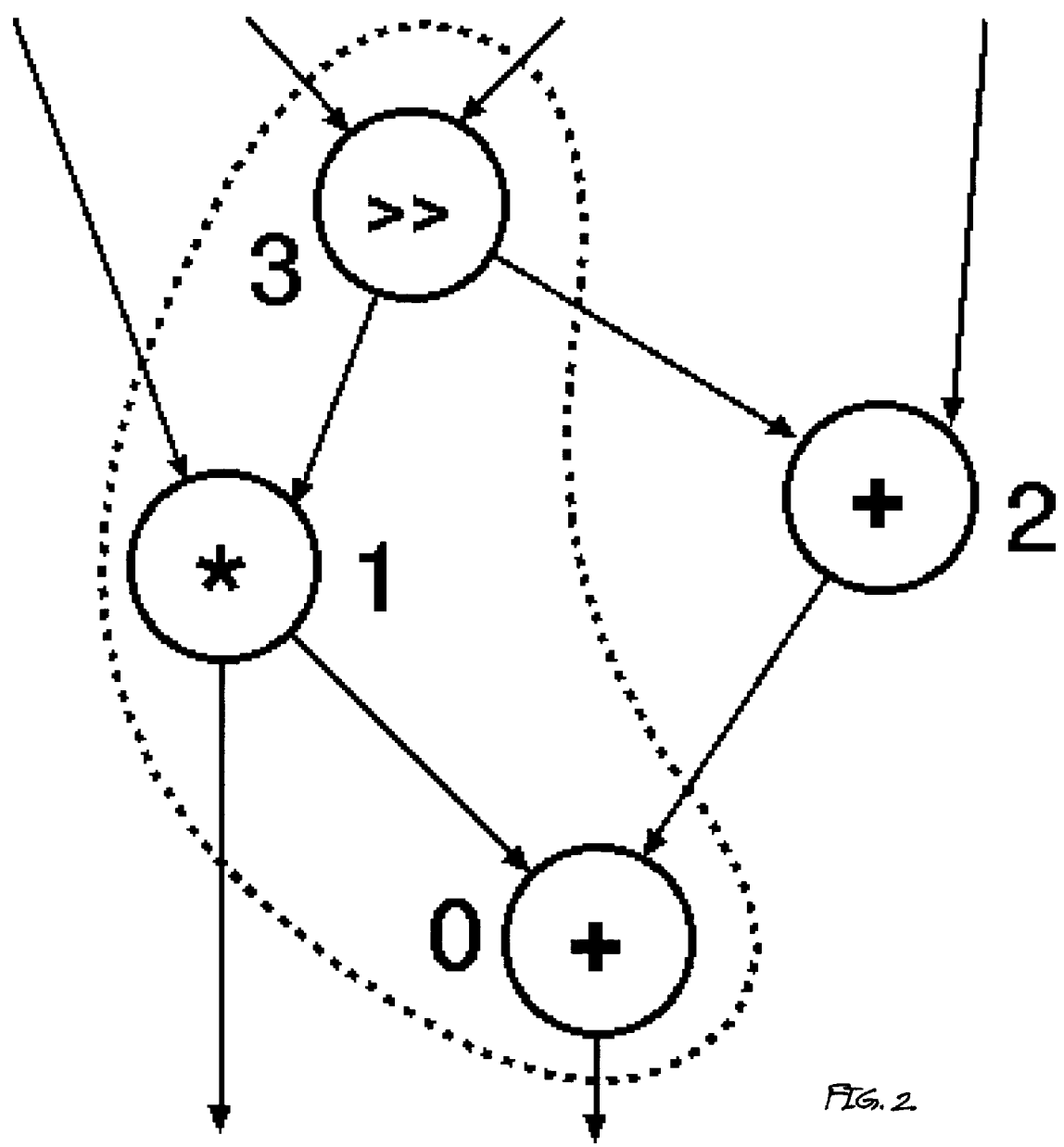
FIG. 2 is a representation of a subgraph of the dataflow graph that does not satisfy a convexity requirement.

IN(S) denotes the number of predecessor nodes of those edges which enter the cut from the rest of the graph G+, i.e. the number of inputs to the operations in S. Correspondingly, OUT(S) is the number of predecessor nodes in S from which edges exit the cut S. They represent the number of outputs from S to other operations, either in G or another basic block. A cut S is called convex if there exists no path from a node u in S to another node v in S involving a node w not in S. For contrast, FIG. 2 shows an example of a non-convex cut.

With each basic block considered independently, an identification problem can be normally stated as follows:

Problem 1. Given a graph G+, find the cut S which maximizes M(S) under the following constraints: 1. IN(S)≦Nin, 2. OUT(S)≦Nout, and 3. S is convex.

Chosen values Nin and Nout indicate the register-file read and write ports, respectively, which can be used by the special instruction. The convexity constraint is a legality check on the cut S and serves to ensure that a feasible solution exists. As illustrated by FIG. 2, if all inputs of an instruction are to be available at issue time, and all results are produced at the end of instruction execution, there is no possible schedule which can respect the dependencies of this graph once S is collapsed into a single instruction.

Several special instructions from all basic blocks will be allowed, with Ninst denoting the maximum number of cuts which together give the maximum advantage. For final selection of Ninst cuts, a heuristic approach can involve repeatedly solving Problem 1 on all basic blocks and by selecting the Ninst best ones. A formal statement is as follows:

Problem 2. Given the graphs Gi+ of all basic blocks, find up to Ninst cuts Sj which maximize Σj M(Sj) under the constraints 1 to 3 of Problem 1 for each cut Sj.

A novel method for solving Problems 1 and 2 can be described in terms of the following three steps: (1) find the optimal single cut in a single basic block, (2) find an optimal set of non-overlapping cuts in several basic blocks, and (3) find a near-optimal set of non-overlapping cuts in several basic blocks.

Exhaustively enumerating all possible cuts within a basic block may not be computationally feasible in practice, but a method described in the following can be used to explore the complete search space while effectively detecting and pruning infeasible regions during the search. The method starts with a topological sort on G. Nodes of G are ordered such that if G contains an edge (u, v) then u appears after v in the ordering. For illustration, FIG. 2 shows a topologically sorted graph. The method uses a recursive search function based on this ordering to explore a search tree.

Figure 3:
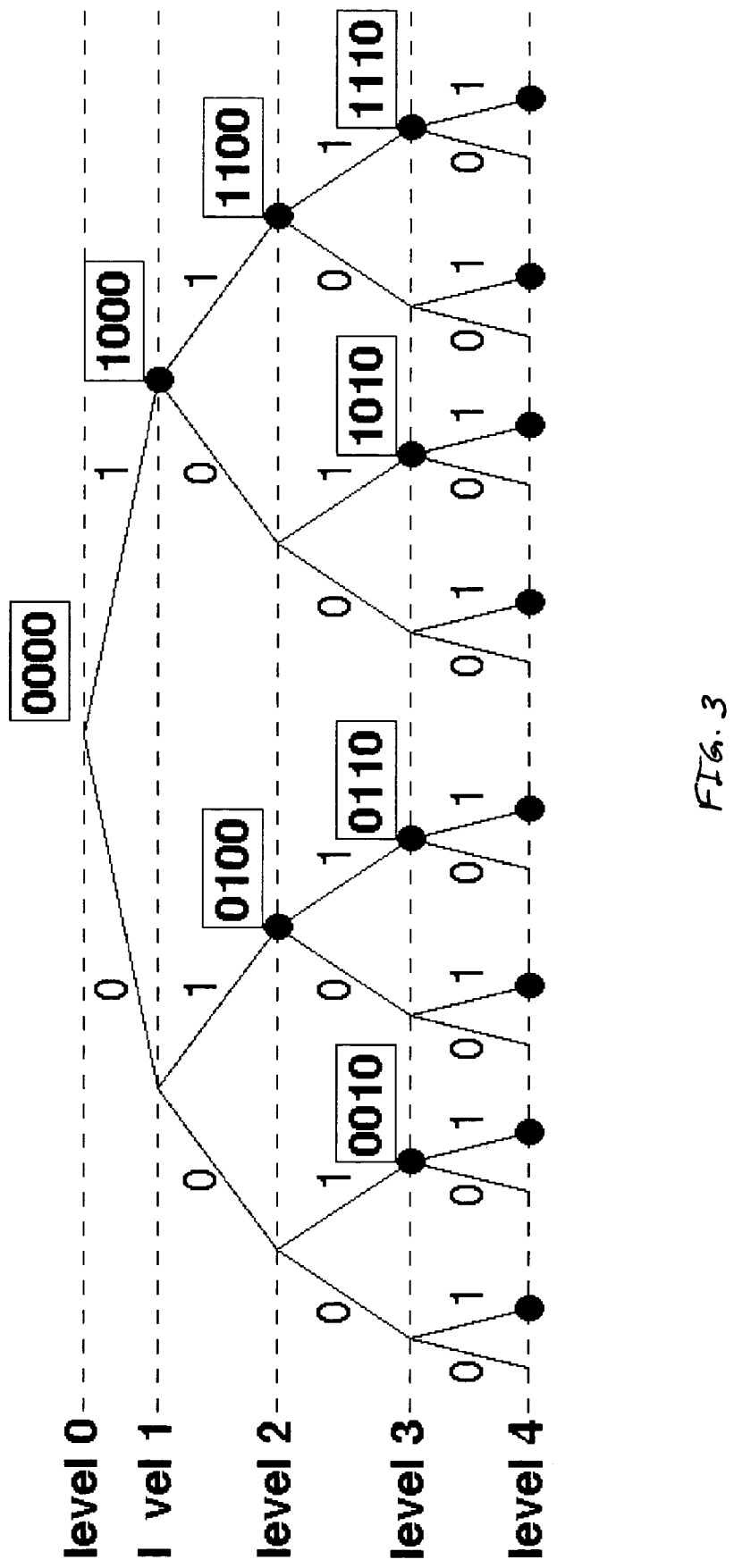
FIG. 3 is a representation of a search tree corresponding to the subgraph shown in FIG. 2.

FIG. 3 shows the search tree for the example of FIG. 2, with some of the tree nodes labeled with their cut values. The search tree is a binary tree of nodes representing possible cuts. It is built from a root representing the empty cut, and each pair of 1- and 0-branches at level i represents addition, yes or no, of the node of G having topological order i, to the cut represented by the parent node.

Nodes of the search tree immediately following a 0-branch represent the same cut as their parent node, and can be ignored in the search. The search proceeds as a preorder traversal of the search tree. In some cases there is no need to branch towards lower levels, so that the search tree is pruned.

For instance, when the output port constraint has already been violated by a cut defined by a certain tree node, then adding nodes that appear later in the topological ordering cannot reduce the number of outputs of the cut. Similarly, if the convexity constraint is violated at a certain tree node, there is no way of regaining feasibility by inserting nodes of G that appear later in the topological ordering. For example, with reference to FIG. 2, after inclusion of node 3 the only ways to regain convexity are to either include node 2 or remove from the cut node 0 or node 3. Because of the topological ordering, both actions are precluded in a search step subsequent to insertion of node 3. As a consequence, when the output-port or the convexity constraint is violated when reaching a certain search tree node, then the subtree rooted at that node can be eliminated from the search space.

Violation of the input constraint can be exploited also for pruning. For Example, for the search tree node where node 0 has been included and nodes 1 and 2 have been considered and excluded, the two inputs of node 0 can no longer be eliminated. Thus, an input constraint of 1 would allow pruning of the subtree.

FIG. 4 shows the above method as represented in pseudo-C notation. The search tree is implemented implicitly by use of the recursive search(.) function. The parameter current_choice defines the direction of the branch, and the parameter current_index defines the index of the graph node and the level of the tree on which the branch is taken. When the output-port check or the convexity check fails, or when a leaf is reached during the search, the method backtracks. The best solution is updated only if all constraints are satisfied by the current cut.

FIG. 5 shows application of the method to the graph of FIG. 2, with Nout=1. Only 5 cuts pass both output-port check and convexity check, while 6 cuts are found to violate either output-port constraint or convexity constraint, resulting in elimination of 4 more cuts. Therefore, among 16 possible cuts only 11 are considered.

The graph nodes contain O(1) entries in their adjacency lists on average, as the number of inputs for a graph node is limited in every practical case. Combined with a single node insertion per method step, the input_port_check, output_port_check, convexity_check and calculate_speedup functions can be implemented in O(1) time using appropriate data structures. Thus, the over-all complexity of the method is $O(2^{|V|})$. Although still exponential, the method in practice reduces the search significantly.

FIG. 6 shows run-time performance of the method using an output-port constraint of two on some basic blocks extracted from several benchmarks. An exponential tendency is perceptible, but the actual performance is within polynomial bounds in all practical cases considered. Constraint-based subtree elimination plays an important role in the method's performance. The tighter the constraints are, the faster the method.

Problem 3. Given a graph G+, find the cut which maximizes M(S) under the constraints 1-3 of Problem 1, and under the further constraint 4. S consists of a single connected graph.

Problem 3 can be solved optimally by the method described above with reference to FIG. 3, with an additional pruning potentiality as follows. Every time a maximal connected subgraph is found in a cut under consideration, i.e. a subgraph that cannot grow further without becoming disconnected, the subtree rooted at that node can be pruned.

On account of additional pruning, an optimal solution to Problem 3 can be found considerably faster as compared with Problem 1. On the other hand, if for a certain graph G and certain input/output constraints the optimal solution to Problem 1 resulted in a disconnected graph, then solving Problem 3 on the same graph and under the same constraints would not yield the same solution. An efficient compromise can be stated as follows:

Problem 4. Given a graph G+, find the cut which maximizes M(S) under the constraints 1-3 of Problem 1, and under the further constraint 4'. S does not include any maximal connected graphs S_I with $M(S\_I)<\alpha \cdot M(S\_Prob\_3)$ where M(S_Prob_3) is the merit of the optimal solution of Problem 3, being a single connected graph.

The parametric factor α has a value between 0 and 1, chosen experimentally for example. With α=0 in Problem 4, Problem 1 can be viewed as a special case of Problem 4.

Problem 4 can be solved optimally the method described above with reference to FIG. 3, with an additional pruning potentiality as follows. Every time a maximal connected subgraph is found in a cut under consideration, i.e. a subgraph that cannot grow further without becoming disconnected, the subtree rooted at that node can be pruned provided its gain is less than α·M (S_Prob_3). For this purpose, the value of M(S_Prob_3) can be found by prior solution of Problem 3.

In trials with α=0.7, the method was applied successfully to Problem 4 on graphs of up to 400 nodes, while solving Problem 1 for graphs beyond 100 nodes became increasingly impracticable. Where comparison was feasible, the difference in gain of the two solutions was insignificant.

A method as described above is adaptable for determining multiple cuts from a single graph. If M is the number of cuts to be identified within a basic block, it is sufficient to establish a similar search tree where every node makes M+1 branches instead of 2. FIG. 7 shows a fragment of a tree for M=2. Nodes of the search tree now represent M cuts. An n-branch at level i results in inclusion of the graph node with index i in the n-th cut.

Figure 8:
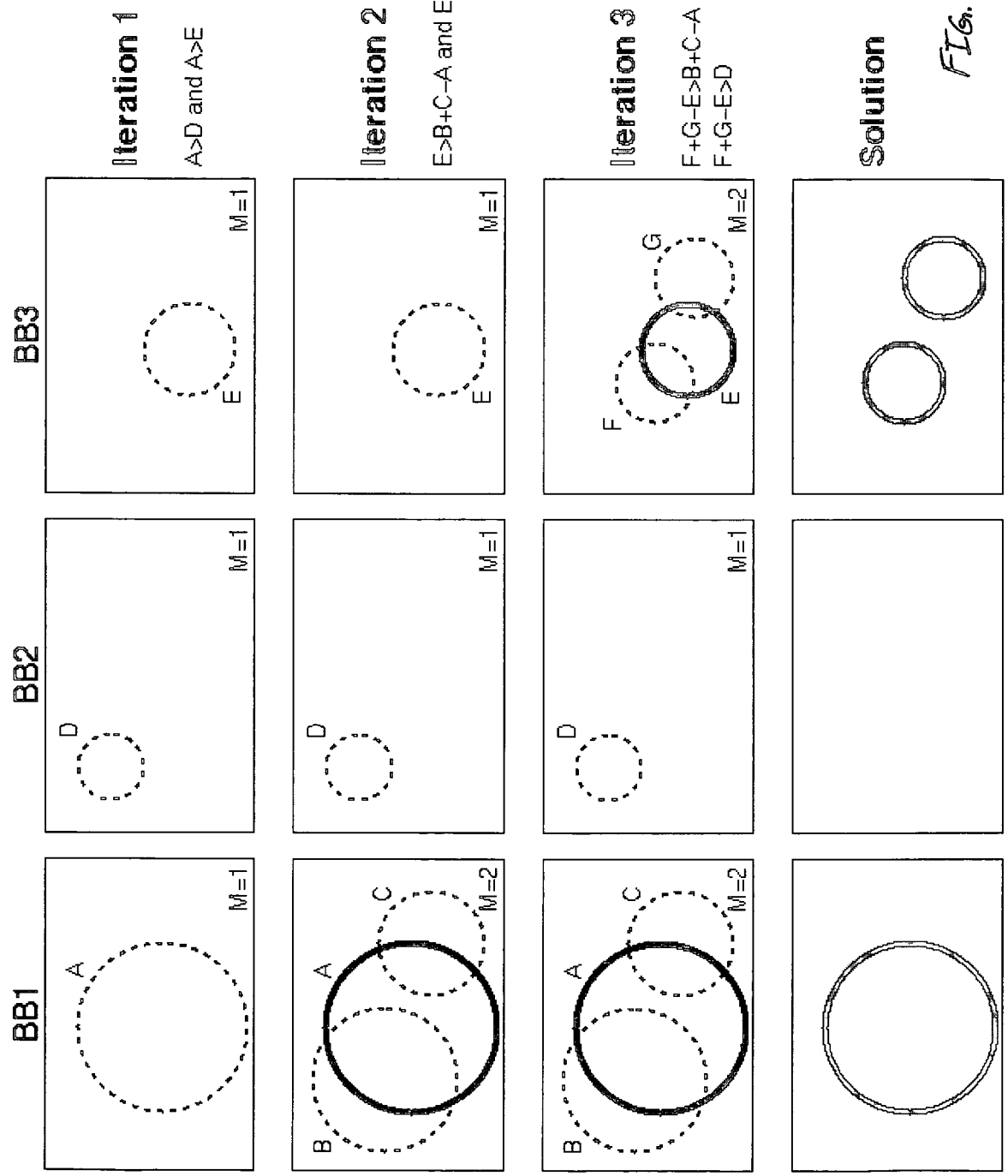
FIG. 8 is a representation of cuts in optimal selection of three cuts in three basic blocks.

For optimal selection, the method begins by applying the single-cut identification method on each basic block (M=1). The first cut is chosen from that basic block which offers the greatest speed-up improvement. Then, at each iteration, the method increments the value of M for the basic block which was chosen by the previous iteration, performs multi-cut identification on this basic block with the new value of M, and determines the improvement. Again the new cut is chosen from the basic block that gives the greatest speed-up improvement. The iteration continues until Ninstr cuts have been chosen. The method yields an optimal solution upon applying the multiple-cut identification method at most Ninstr+Nbb−1 times where Nbb denotes the number of blocks. FIG. 8 illustrates the method's use in a simple case with three blocks.

Repeated execution of the multiple-cut identification method on large blocks can result in impracticable computational complexity. Remedially, a heuristic approach can be used, with iterative applications of the single-cut identification method to the same basic block. Previously identified cuts are merged into single graph nodes, and are excluded from subsequent identification steps.

A practical setting for benefiting from the described techniques can involve an initial high-level code for an application, compilation of the high-level code into intermediate-level code, and, from the intermediate-level code, automated generation of instruction-set extensions under one or several constraints as described above. The instruction-set extensions can be specified in VHDL, for example (VHDL: VHSIC (Very High Speed Integrated Circuit) Hardware Description Language). A standard Synopsis design tool, or a tool chain such as from LisaTek (Coware) or from Tensilica can synthesize the specification onto hardware.

Techniques as described above, optimal as well as iterative, were implemented within the MachSUIF framework of M. D. Smith et al., An Introduction to Machine SUIF and its Portable Libraries for Analysis and Optimization, Harvard University Press, Cambridge, Mass., 2000. The implementations were tested on a subset of the MediaBench suite benchmarks of C. Lee et al., A Tool for Evaluating and Synthesizing Multimedia and Communications Systems, Proceedings of the 30$^{th}$ Annual International Symposium on Microarchitecture, pp. 330-335, Research Triangle Park, N.C., December 1997. Application C-code is translated to MachSUIF intermediate representation and pre-processed with a standard if-conversion pass. The results were compared with those of a greedy linear-complexity method that can detect n-input, m-output graphs, where n and m are specified parameters. The results were compared further with a linear complexity method that identifies single-input and unbounded-input graphs.

In the tests, the difference between optimal and iterative methods was found to insignificant, with both outperforming the prior-art methods. For low input/output constraints, performed comparably, but in the case of higher, still very reasonable constraints, the iterative method excelled. As compared with the prior art, for the present methods there is a significant potential performance advantage for multiple-output and generally disconnected graphs.

The invention claimed is:

1. A computer implemented process for generating a micro-processor instruction set extension for a processor application, comprising:

generating a data flow graph G(V,E) of nodes V representing primitive operations of the processor application and edges E representing data dependencies of said application;

evaluating subgraphs S of G(V,E) as candidates for an instruction set extension, each said subgraph S having a number of inputs IN(S) and a number of outputs OUT (S), said instruction set extension having a number of available register-file read ports Nin and a number of available register-file write ports Nout;

wherein said evaluating a subgraph S includes,
if OUT(S) is less than or equal to Nout, and
if S is convex, and
if IN(S) is less than or equal to Nin,
then identifying S as a candidate for transformation into an instruction set extension, else disregarding S as a candidate for transformation into an instruction set extension;

wherein S is convex when no path exists from a node in S to another node in S when said path involves a node that is not in S;

evaluating said identified candidates using a function M(S) as a measure of merit;

transforming said instruction set by adding an instruction set extension representing said identified candidate to said instruction set if said candidate satisfies said function M(S).

2. The process of claim 1, further comprising:
performing said evaluating of subgraphs S for a plurality all subgraphs S in a plurality of data flow graphs G representing all basic blocks of said processor application;
selecting a number j of identified candidates satisfying said evaluation to form a candidate set Sj which maximizes $\Sigma j\ M(Sj)$; and
transforming said candidate set Sj into instruction set extensions for said processor application.

3. The process of claim 1, comprising:
performing said evaluation of subgraphs S for a plurality of subgraphs S in a single basic block of said processor operation;
identifying a single optimal S in said plurality according to said function M(S); and
transforming said instruction set by adding an instruction set extension representing only said optimal S.

4. The process of claim 3, comprising:
identifying an optimal set of non-overlapping subgraphs S in a plurality of basic blocks of said processor operation according to said function M(S); and
transforming said instruction set by adding one or more instruction set extensions representing said optimal set of non-overlapping subgraphs.

5. The process of claim 3, comprising:
identifying a set of non-overlapping subgraphs S in a plurality of basic blocks of said processor operation according to said function M(S); and
transforming said instruction set by adding one or more instruction set extensions representing said set of non-overlapping subgraphs.

6. The process of claim 3, comprising:
performing a topological sort on G;
ordering nodes of G such that if G contains and edge (u,v) then u appears after v in said ordering; and
utilizing a recursive search function based on said ordering.

7. A system for generating a micro-processor instruction set extension for a processor application, comprising:
computer means for generating a data flow graph G(V,E) of nodes V representing primitive operations of the processor application and edges E representing data dependencies of said application;

computer means for evaluating subgraphs S of G(V,E) as candidates for an instruction set extension, each said subgraph S having a number of inputs IN(S) and a number of outputs OUT(S), said instruction set extension having a number of available register-file read ports Nin and a number of available register-file write ports Nout;

wherein said evaluating a subgraph S includes, if OUT(S) is less than or equal to Nout, and if S is convex, and if IN(S) is less than or equal to Nin, then identifying S as a candidate for transformation into an instruction set extension, else disregarding S as a candidate for transformation into an instruction set extension;

wherein S is convex when no path exists from a node in S to another node in S when said path involves a node that is not in S;

computer means for evaluating said identified candidates using a function M(S) as a measure of merit; and computer means for transforming said instruction set by adding an instruction set extension representing said identified candidate to said instruction set if said candidate satisfies said function M(S).

* * * * *